United States Patent [19]
Guillou et al.

[11] Patent Number: 5,305,383
[45] Date of Patent: Apr. 19, 1994

[54] METHOD OF ELECTRONIC PAYMENT BY CHIP CARD BY MEANS OF NUMBERED TOKENS ALLOWING THE DETECTION OF FRAUD

[75] Inventors: Louis-Claude Guillou, Rennes, France; Jean-Jacques Quisquater, Brussels, Belgium

[73] Assignees: France Telecom, Telediffusion de France S.A., France; U.S. Philips Corporation, New York, N.Y.

[21] Appl. No.: 107,413

[22] Filed: Aug. 16, 1993

Related U.S. Application Data

[63] Continuation of Ser. No. 862,088, Apr. 2, 1992, abandoned.

[30] Foreign Application Priority Data

Apr. 3, 1991 [FR] France .................................. 91 04035

[51] Int. Cl.$^5$ ........................... H04L 9/00; G07F 7/08
[52] U.S. Cl. ........................................ 380/24; 380/25
[58] Field of Search ................. 380/24, 25; 235/380, 235/381, 382, 382.5, 472, 487

[56] References Cited

U.S. PATENT DOCUMENTS

| | | | |
|---|---|---|---|
| 4,802,218 | 1/1989 | Wright et al. | 380/25 |
| 4,870,589 | 9/1989 | Takahata et al. | 235/380 |
| 4,914,698 | 4/1990 | Chaum | 380/25 |
| 4,987,593 | 1/1991 | Chaum | 380/25 |
| 4,996,711 | 2/1991 | Chaum | 380/25 |
| 5,065,429 | 11/1991 | Lang | 380/25 |
| 5,131,039 | 7/1992 | Chaum | 380/25 |
| 5,140,634 | 8/1992 | Guillou et al. | 380/24 |

FOREIGN PATENT DOCUMENTS

| | | | |
|---|---|---|---|
| 0010496 | 4/1980 | European Pat. Off. | |
| 0349413 | 1/1990 | European Pat. Off. | 380/25 |
| 8503787 | 8/1985 | World Int. Prop. O. | |

*Primary Examiner*—Salvatore Cangialosi
*Attorney, Agent, or Firm*—David Schreiber

[57] ABSTRACT

Method of electronic payment by chip card.

According to the invention, each token carries a number making it possible to check its authenticity.

The invention is used for electronic payment.

15 Claims, 2 Drawing Sheets

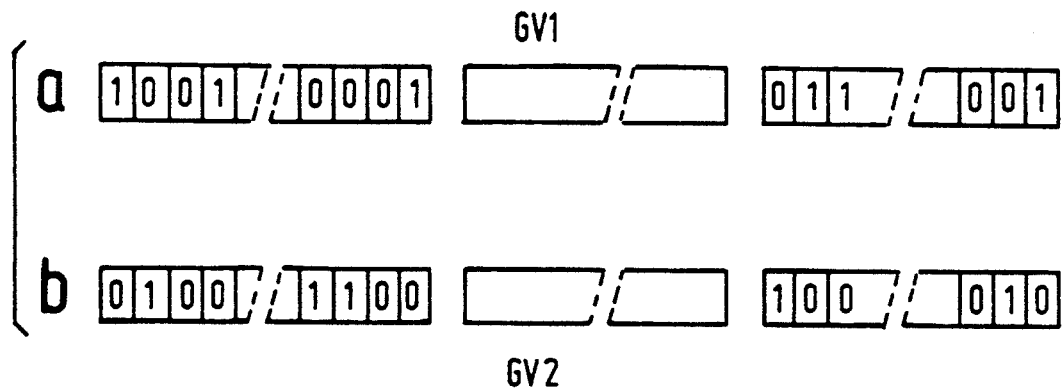
FIG.4
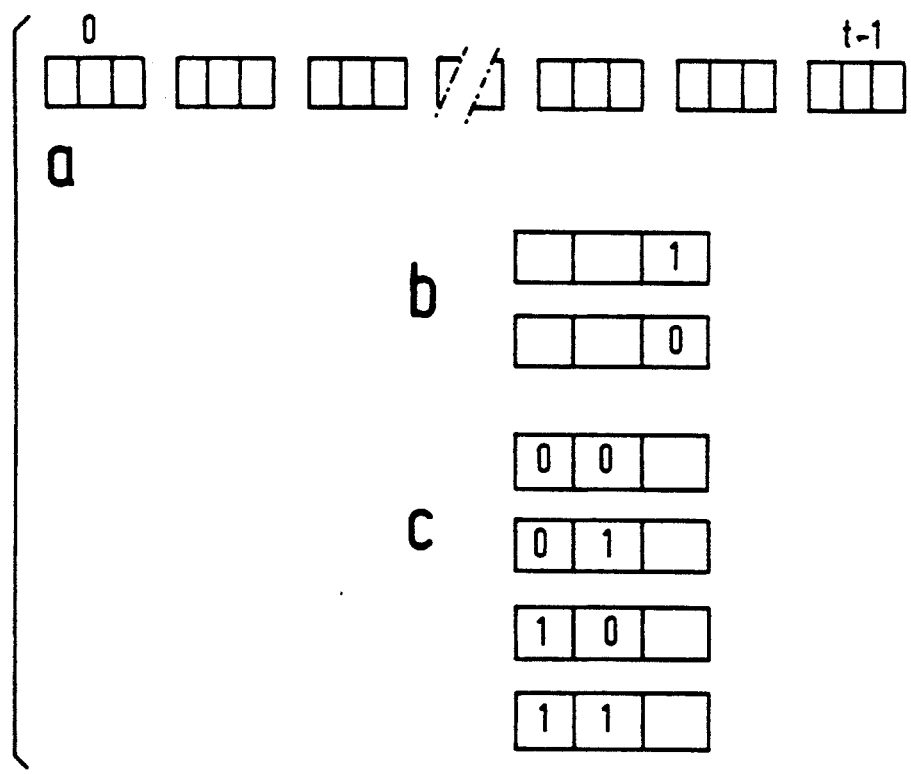
FIG.5
FIG.6

METHOD OF ELECTRONIC PAYMENT BY CHIP CARD BY MEANS OF NUMBERED TOKENS ALLOWING THE DETECTION OF FRAUD

This is a continuation of application Ser. No. 07/862,088, filed Apr. 2, 1992 now abandoned.

DESCRIPTION

The subject of the present invention is a method of electronic payment by chip card by means of numbered tokens, allowing the detection of fraud.

It is known that, at the present time, a plurality of types of chip card are currently used to pay for goods or services. For example, in France, telephone cards and PASTEL (registered trademark) cards are used in public telephones; bank cards are employed in shops and PC2 cards are used on VISIOPASS (registered trademark) pay-television terminals.

In public telephones, the consumption of the charge units in telephone cards is local and anonymous. Statistics give an idea of the traffic going through each booth. The transaction statement simply gives the amount of units consumed and the number called. But at one bit for each consumed unit it is not possible to conduct an audit of the statements in order to detect possible false telephone cards. There is no means of distinguishing an "authentic" bit from a "fraudulent" bit.

Fraud is combated by various physical measures, such as the search for suspect wires in the telephone card or a check of the shape of electronic signals. Although anonymity is certainly ensured, the rudimentary detection of false telephone cards depends on the physical security of the public telephones.

In shops, a certificate is calculated at each transaction with a bank chip card. Each payment gives rise to a transaction statement and then the transmission of the corresponding parameters (an electronic mini-invoice of several hundred bits) to the shopkeeper's bank for a subsequent reimbursement transaction with the customer's bank. Security is high, but there is no anonymity.

For conditional access, keyholder cards are used. Depending on the particular versions of the keyholders, services are obtained on subscription, on demand or by time. The PCO card serves for a stockbroking service made available by the ANTIOPE process. The PC1 card serves for monitoring access to TRANSPAC. The PC2 card serves for the VISIOPASS (registered trademark) program developed by FRANCE TELECOM. The authentication of the card and the management of the access titles are greatly improved. However, charging per time length, available at the present time only on the PC1 and soon on a new version of the PC2, for the moment uses only a single bit per token.

The use of bank cards in public telephones may also be stressed: a single bit is consumed for each charge unit. Whereas the consumption of units remains anonymous, the purchase of each block of 120 tokens gives rise to a personalised invoicing via the banking network.

Many services are paid for by tokens, vouchers, money or their electronic counterpart. The electronic counterparts in a chip card are very useful to transport operators: motorway, underground railway, train, 'bus, tram, taxi and car parks. But there are many others: for example, telephone, radiotelephone and telematic services.

The general problem presented by these techniques is to find an economically viable token management method allowing both payment anonymity and the detection of fraud.

Where time charging is concerned, when a single bit is consumed for each charge unit the tokens cannot be labelled for the purpose of detecting and diagnosing fraud by means of an audit of the transaction statements; nor is it possible to settle disputes between various operators of services drawing from a common stock of tokens.

The object of the present invention is precisely to remedy this deficiency by providing a method in which a plurality of bits is used for each charge unit. In other words, the tokens are numbered in order to distinguish what is genuine from what is false.

This solution satisfies the various constraints mentioned above: anonymity, viability and resistance to fraud. The method of the invention can be incorporated in any chip card, including new versions of the PC1, PC2, MP or TB100 masks.

Before the characteristics and advantages of the invention are explained in detail, it is expedient to give a brief summary of chip cards. For this purpose, a distinction will be made between telephone cards, bank cards and the new masks which have appeared recently.

As regards telephone cards, it will be recalled that these are electronic devices designed to make it possible to pay for telecommunications. At the present time, FRANCE TELECOM sells telephone cards in sealed packaging to anonymous consumers. Approximately 5,000,000 telephone cards are sold each month. More than 100,000,000 telephone cards have been produced hitherto. It is a fast-expanding market.

In these telephone cards, the components measure a few square millimeters. These are simple memories without any possibility of computation. Their manufacturers would like them to be used widely in other sectors. However, the problems presented are difficult to solve in view of the very limited logical capacities of these chips.

As the technology changes and fraud appears, a second-generation telephone-card design is being developed. The component is a memory equipped with a wired logic which can be authenticated by wired computation. This component is intended for limiting fraud. However, the use of the component in other sectors would involve sharing some information which it would be preferable to keep confidential or even secret. And at all events, in this component, the tokens are still limited to a single bit per charge unit, thus preventing the same stock of tokens from being shared among a plurality of operators.

Referring now to bank cards, it is known that, in France, chips are integrated in them at the present time. These chips carry the mask M4. The number of M4 cards produced hitherto (not only for banks) amounts to approximately 20,000,000. The size of the chips supporting M4 is fifteen to twenty square millimeters at the present time.

Each M4 card is equipped with a diversified secret number. In each system using M4 cards, security modules having the master key of the system are capable of reconstructing internally the diversified secret of any card to which they are addressed and then of using it to check the results received or to protect the actions ordered.

The M4 mask is personalised in various ways. Bank cards are personalised in the BO mode. M4 cards are therefore employed in highly varied uses. But in practice, it is very difficult for a plurality of uses to coexist in the same card with the M4 mask, since this mask has not been designed for that purpose.

New masks have appeared recently, such as the PC2 mask designed for pay television by the CCETT (Centre Commun d'Etudes de Télédiffusion et Télécommunications) [Joint Broadcasting and Telecommunications Study Centre] and BULL CP8, the MP mask designed by BULL CP8 and the TB100 mask designed by PHILIPS and BULL CP8. Each card carries one (or more) bunch(es) of cryptographic keys. In each bunch, the keys used for managing the elements of the system (management keys) are distinct from the keys used for controlling access to the services (operating keys). These masks are designed for sharing the card among a plurality of issuers of access titles and service operators. A master key has to be employed in a security module, also called a "master card", for these various masks, in order to open or manage an entity in the card of a user, also called a "slave card".

The concepts developed in these recent masks are being standardised at the ISO. In these cards allocated to a plurality of uses (so-called "multi-service" cards), a master entity embodied by a master file (abbreviated to MF) has generated dedicated entities embodied by dedicated files (abbreviated to DFs). It has been possible for dedicated entities themselves to generate new dedicated entities recursively. Each of these files (MF, DF) contains various elementary files (abbreviated to EFs). The main right which a master entity or dedicated entity reserves is thus the right of life and death over each of its immediately descendant dedicated entities. By killing one entity, all those descending from it are obviously killed at the same time.

In a multi-service card, the authority which has issued the card is represented by the master entity which has delegated some of its powers to the dedicated entities by assigning a share of the resources of the card to them. A plurality of dedicated entities coexist in the same card, without the security of one affecting the security of the others and without the master entity disturbing the dedicated entities and being able to reach the secrets deposited in them.

The main operations executed during the "use" phase of the life of multiservice cards are as follows:

issue: this involves generating the master entity by the authority issuing the card, personalisation: this involves completing the master entity so as to assign it to a particular consumer, delegation: this involves generating the resources of the card and assigning them to a dedicated entity which in the card embodies an issuer of access titles, valorisation: this involves noting or modifying in a dedicated entity various informations representing the access rights or describing a contract between the consumer and a service operator, consumption: this involves noting or modifying in a dedicated entity information describing the execution of the contract between the consumer and a service operator.

To solve the problems presented by these operations occurring throughout the life of multi-service cards, present-day masks employ secret-key cryptographic algorithms with a hierarchy of secret keys. The card issuer has a bunch of master keys which are diversified in the cards into secondary keys as a function of data changing from one card to another (for example, serial number of the chip or account number of the consumer). Each security module or each master card records and uses one or more master keys. The primary keys of an issuer of access titles or of a service operator are then transmitted under the protection of a key belonging to the card issuer.

However, it is not very safe for the issuer of access titles or for the service operator to distribute his own secrets under the control of the secrets of another, even though it be the card issuer, or for the card issuer to place master keys in relatively anonymous security modules dispersed in large numbers in an environment which is beyond his control. Public-key algorithms will, in future, be used in cards in order to improve the management of the keys and the authentication of the cards. Techniques with no disclosure of knowledge are the logical conclusion of public-key algorithms. However, the method which is the subject of the present invention is independent of the cryptography employed in the cards.

In this general context of chip cards, the present invention provides a method of electronic payment which readopts the main operations known in this type of method, namely:

a) an issuing entity capable of issuing electronic money assigns to cards means of payment called tokens, these tokens consisting of binary information written in a memory file of the card, b) to remunerate a service operator for a service with such a card, the card is debited with a particular number of tokens to the credit of the service operator, c) the service operator accounts for the tokens received and is thereby remunerated by the issuing entity, the method of the invention then being characterised in that:

A) an initial set of t consecutive numbers is formed in the issuing entity and some numbers selected quasi at random are removed from this set, thus leaving a set of numbers available for sale, B) to assign tokens to a particular card:
  some numbers are selected quasi at random from the set of numbers available for sale
  these numbers are assigned to the card as tokens, each token (called a "voucher") thus consisting of a group of bits coding the number assigned as a token,
  the numbers thus assigned are removed from the set of numbers available for sale, C) to remunerate the service operator for a service by means of vouchers, the card reveals the numbers of these vouchers to him, D) the service operator collates all the numbers which he has received from various cards and returns them to the issuing entity for payment of his services, the said entity checking the authenticity of the numbers thus returned.

The issuer of access titles can be a bank issuing electronic money to pay for any kind of service, a body issuing traveller's cheques or a body issuing tokens to pay for specific services by means of charge units.

The numbering of the tokens, which is the essential characteristic of the invention, makes it possible to solve the set problem, namely the checking of the authenticity of the tokens, whilst at the same time preserving anonymity.

At all events, the characteristics and advantages of the invention will emerge more clearly from the following description. This description relates to exemplary embodiments which are given by way of explanation and are in no way limiting and refers to accompanying drawings in which:

FIG. 4 illustrates sales arrays;

FIG. 5 shows an embodiment of a 2-octet voucher, and

FIG. 6 illustrates a checking array.

Figure 1:
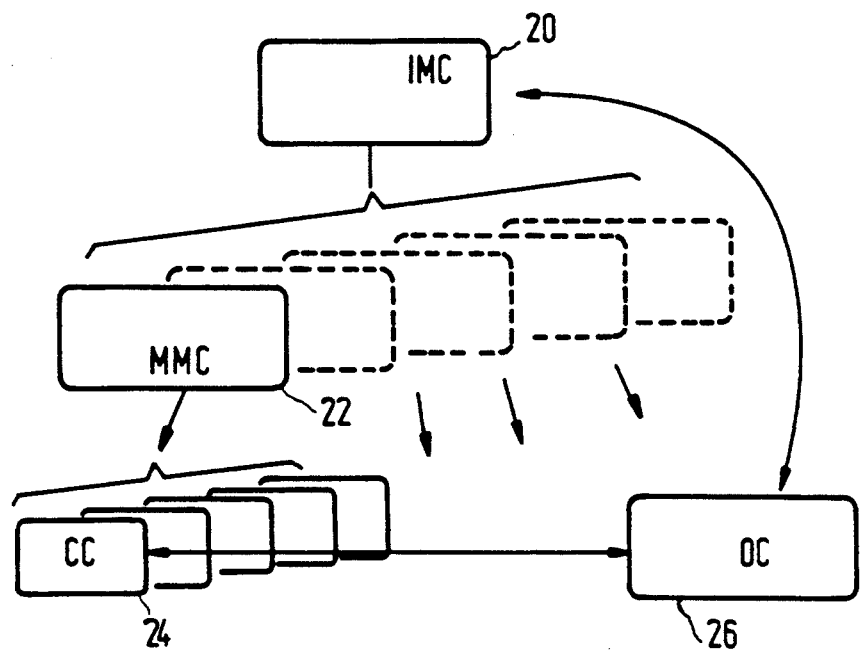
FIG. 1 illustrates diagrammatically the organisation of a general system making use of the method of the invention.

In general, but not exclusive terms, the method of the invention can be employed in a system such as that illustrated in FIG. 1. This system uses four types of chip card:

initial management cards (IMC) 20 (of the overlord-card type) serving for producing master management cards, master management cards (MMC) 22 inserting tokens into the consumption cards, consumption cards (CC) 24 (of the slave-card type) embodying access titles in the form of tokens, operating cards (OC) 26 (of the master-card type) extracting tokens from the consumption cards (CC).

The initial management cards (IMC), master management cards (MMC) and master operating cards (OC) are issued by a card issuer who personalizes them for issuers of access titles.

The slave consumption cards (CC) are likewise issued by the card issuer. Depending on the conditions of distribution, these cards can either remain the property of the card issuer or become the property of their holder. Preferably anonymous, they could, however, be personalised. In some applications, the card issuer can be identical to the issuer of access titles.

The purpose of the invention is to sell numbered tokens, also called "vouchers". These vouchers are organised as booklets formed from numbers taken at random from a set or at least at a random as far as apparent to an observer. Within each set sales are deliberately limited in order to keep a high proportion of unsold numbers (for example, of the order of 50%) likewise selected at random or apparently at random. Only the issuer of access titles distinguishes the "genuine tokens" from "false tokens".

The management cards are personalised in order to make the sellers liable. Randomness, or at least apparent randomness associated with pseudo-chance, is introduced into the numbering of the tokens in order:

to ensure that the anonymity of the consumers is protected, to allow an audit of the transaction statements for the purpose of detecting and diagnosing anomalies, to check the activity of the service operators in a competitive situation.

As a result of the numbering of the tokens, fraud within the scope of the invention is detected and located as soon as it appears. The deliberate aim is to put the defrauder in an insecure position.

If, as a result of a violation of a consumption card, a bunch of keys and a booklet of vouchers are revealed in a set, it will be impossible subsequently to make false cards which would pass unnoticed.

Likewise, if, as a result of the violation of a management card, a bunch of keys and a group of saleable numbers are revealed in a set, it is sufficient that the theft of the card be signalled for the defrauder's efforts to be nullified. Even if the theft is not signalled, the fraud and the suspect seller are nevertheless detected.

Likewise again, if an operator wants to increase his receipts by adding numbers in his transaction statements, if he invents numbers he cannot avoid the unsold numbers which are actual false tokens. And if he repeats numbers already received, he draws attention to himself even before the fraud is sufficiently extensive to become profitable.

It should be noted that, since the fraud is measurable, the level of penalties can be matched to the extent of this.

In general, the functions performed in the various cards of the system of FIG. 1 are as follows:

MANAGEMENT CARDS

The issuer of access titles distributes management cards to sellers. Each management card forms booklets of vouchers within a set defined by an identifier, a period of validity and a bunch of secret keys. The sales of booklets are accounted for in it according to type of booklet. Each management card checks its operations on a sales grid (the structure of which will be described later), in such a way that each number can be sold only once. The identifier of the set and the number of booklets sold can be consulted freely in the management card.

However, the consultation of the sales array is subject to prior authentication by the issuer of access titles. The state of the array is thus supplied by the management card, preferably in scrambled form, so that seeing the data exchanged at the interface does not make it possible to know the state of the sales array. The issuer can thus consult remotely the temporary state of his sales arrays in his management cards at the sellers'. When the sale is completed, the management card is returned by the seller to the issuer of access titles.

The operation of selling a booklet of n vouchers involves the following elementary operation repeated n times: a number is taken at random; the first sellable number from this number is selected (when the last number is reached, there is an automatic return to the first); the sales array is updated in the management card by reversing the state of the bit corresponding to the number sold.

CONSUMPTION CARDS

The generation of a booklet of n vouchers involves writing, in a dedicated file of a consumption card, a set identifier, a period of validity, a bunch of secret keys and the n vouchers. The numbers passing between the management card and the consumption card are preferably scrambled, so that seeing the data exchanged at the interface does not make it possible to draw up a list of the numbers sold.

The numbers of the vouchers not consumed in a booklet are preferably kept secret in the consumption card. They are revealed one by one at the moment of their consumption. A revealed voucher can no longer be used and is no longer secret. A consumed voucher is invalidated in the consumption card. If the technology allows, the invalidated booklets, indeed even the invalidated vouchers, can be erased in the consumption card.

OPERATING CARDS

The issuer of access titles likewise distributes operating cards to the service operators. Each operating card contains vouchers within sets each defined by an identifier, a period of validity and a bunch of secret keys. The consumption operation involves mutual authentication between the consumption card and the operating card by the use of one of the secret keys of the bunch. During this authentication, at the request of the operating card, numbers are revealed to the operating card by the consumption card. The numbers passing between the consumption card and the operating card are preferably scrambled, so that seeing the data exchanged at the interface does not make it possible to draw up a list of the numbers consumed.

For each set which he sees, the service operator therefore collects numbers which he can organise either as an ordered list of numbers or as a consumption grid, depending on the most economical method. He periodically signs these lists or these grids, for example by means of an integrity code, and then returns them to the central system for endorsement, that is to say in order to recover payment for his services. He prepares anomaly reports when he detects sets in opposition or under special monitoring. In fact, the issuer of access titles also provides him with blacklists of set identifiers and of particular vouchers in particular sets.

Various special steps of the method of the invention will now be described.

Figure 2:
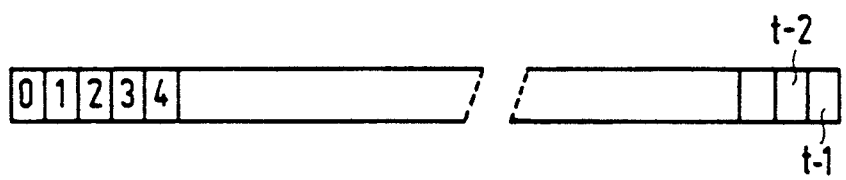
FIG. 2 shows a set of numbers.

First of all, a sequence of consecutive numbers organised as a set is formed. A set consists of an identifier, a period of validity, a bunch of secret keys and a field of t consecutive numbers. This information is generated by an issuer of access titles. FIG. 2 thus shows diagrammatically an array of t consecutive numbers (from 0 to $t-1$).

A set can comprise, for example, 64,000 tokens numbered from 0 to 63,999, each coded by 16 bits; the sale can be limited to approximately 30,000 numbers in the set. A booklet can comprise 10, 20, 60, 90, 120 or even 240 vouchers. It is even possible to sell by the unit, although this does not make the best possible use of the memories in the consumption card.

In an operation for issuing and personalising initial management cards, the card issuer prepares initial management cards (of the "overlord" type) carrying a dedicated file with an identifier, a primary key, a distribution array and a facility for counting and locating the management cards produced.

Figure 3:
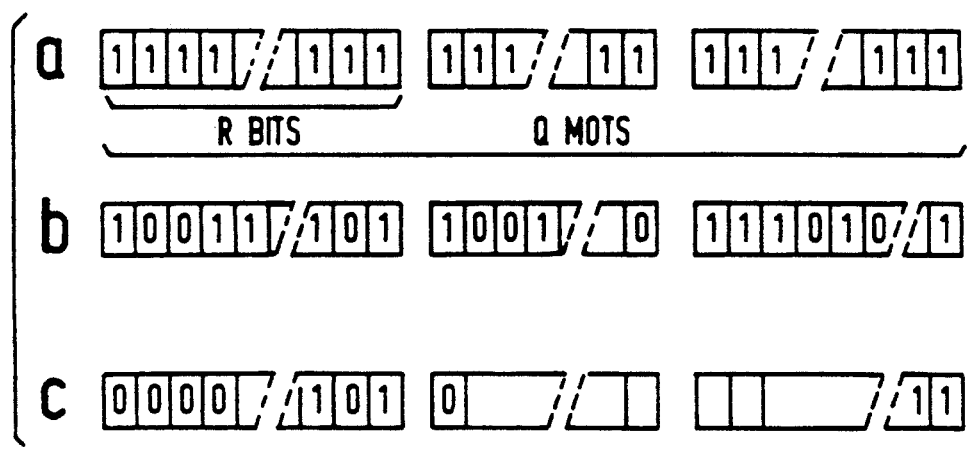
FIG. 3 shows a distribution array.

A distribution array is illustrated in FIG. 3. It comprises Q words each of R bits (for example, 250 words each of 256 bits). All these bits are initially in the state 1 (part a).

The issuer of access titles first completes the dedicated file in order to assign it to a set, placing in it the identifier of the set and a bunch of secret keys. He then removes a particular proportion of vouchers which will never be sold. To do this, in each of the Q words of the distribution array he changes to 0 a particular number of bits taken at random or at least in apparant randomness. The state of the array obtained is illustrated in part b of FIG. 3. It is possible, for example, to change 60 bits to 0 in each word of 256 bits. 15,000 numbers are thus removed.

The card issuer also prepares the management cards. Each management card carries a dedicated file with an identifier, a primary key, a facility for counting the booklets sold, and finally a sales array. A sales array comprises Q words of R bits, all initially at 1 (for example, 250 words of 256 bits). The card issuer supplies these management cards to the issuer of access titles.

The issuer of access titles first completes the dedicated file in order to assign it to a set, placing in it the identifier of the set and a bunch of secret keys. He also prepares as many counters as there are types of sellable booklets. A type corresponds, for example, to a number of vouchers per booklet or to special tariffing conditions.

He then prepares a sales array on it by means of the initial management card, making it possible to distribute the numbers which are still in the state 1 in the distribution array (FIG. 3B). For each of the Q words of the distribution array, from the bits still in the state 1, the issuer selects a certain number, that is p, of them at random or at least in apparent randomness. For example, the number p is 36. The issuer then changes to the state 0:

these p bits in the corresponding word of the distribution array located in the initial management card (FIG. 3c), the (t-p) other bits in the corresponding word of the sales array in the management card, thereby obtaining a sales array GV1 (FIG. 4a).

To form a second sales array GV2 (FIG. 4b), the same operations are executed from the new distribution array (FIG. 3c). The sales arrays GV1, GV2 are therefore disjoint, in that a bit of a particular rank cannot be at 1 simultaneously in the two arrays. Thus, a number of the set can be sold only once.

The sales array, an essential element of a dedicated file in the management card, makes it possible progressively to form booklets of vouchers and sell them:

if the j'th bit of the array is at 1, then the corresponding voucher is saleable, if the j'th bit is at 0, then the corresponding voucher is not saleable, on the sale of a voucher, the corresponding bit changes from 1 to 0.

Consultation of the state of the sales arrays is reserved for the issuer of access titles by an authentication of the issuer by means of the management card.

Finally, the issuer of access titles completes the management card. He enters in the master file, for example, a sales period limiting the use of the management card. He enters in the file dedicated to the set, for example, a sales threshold limiting the selling power of the management card. For example, the sales threshold can be fixed at 244.

In summary, for a given set, the groups of saleable vouchers for each management card are disjoint, and after the completion of a sale for a given set the part common to the groups of unsaleable numbers in the management cards as a whole constitutes the group of numbers which will never be sold, either by an initial decision of the issuer of access titles when he has initialised the distribution array or by a final decision of the issuer of access titles when he has completed the sale of the set in the initial management card.

The issuer of access titles can, for the same set, form a plurality of management cards having the same selling power. Each of these management cards has a subgroup which, in the example taken, comprises 9,000 numbers (250 times (256−220)), of which it can sell up to 6,000 (250 times (244−220)).

However, the selling power can vary from one management card to another. The issuer of access titles prepares the management cards in accordance with the requirements of the sellers.

In practice, a management card could, of course, sell a plurality of sets by carrying the corresponding dedicated files.

For the sale of booklets of vouchers, the following procedure is then adopted. It will be remembered that, in each management card, there is therefore a sales array comprising Q words each of R bits. At the start of sales, in each of these words there are already R-p bits in the state 0, fixed by the issuer of access titles (the example taken above has Q=250, R=256, t=64,000 and p=36). In each file dedicated to a set in each management card, a running marker (which is an octet in the example of Q=250 words) is maintained. It is at zero at the start of sales when the management card is supplied to the seller by the issuer of access titles.

The conventions of the sales grid in the management card may be recalled:

if the bit is at 1, then the corresponding voucher is saleable, if the bit is at 0, then the corresponding voucher is not saleable, at each sale of vouchers, the corresponding bit changes from 1 to 0.

At the start of each booklet sale, the management card checks that the current date appears within the sales period. If the period has not begun, the card refuses the sale. If the period has elapsed, the card invalidates the sales function.

During the sale, with each voucher the marker is incremented by 1 modulo Q (for example, 250), that is to say there is a change to the next word. Then, a new index (which is an octet when R=256) is produced at random in the management card. If the corresponding token is not saleable (bit at zero) in the word of R=256 bits designated by the marker, then the index is incremented by 1 modulo R=256 until a saleable token is found in the marked word.

The number of the voucher sold comprises the bits of the marker and those of the index, that is to say 16 bits in the example taken. The running marker is of high weight (of a value of 0 to 249) and the running index is of low weight (of a value of 0 to 255). The running index constitutes the secret information to be transferred from the management card to the consumption card.

It is possible to extend the numbers of the vouchers by using a base. The number of the voucher then consists of the high-weight base and the sixteen preceding low-weight bits. This makes it possible to use more extensive sets.

At the end of each booklet sale, the management card updates the counter corresponding to the type of booklet sold. It then counts the number of bits at zero in the word designated by the running marker. If this number reaches or exceeds the permitted threshold (244 in the example taken above), then the selling power is spent in the dedicated file. Consequently, the management card closes the sales by automatically invalidating the dedicated file.

The consumption cards are then used in the following way. In a consumption card there are booklets of vouchers embodied by as many dedicated files. The identifier of a dedicated file locates the issuer of access titles. A booklet of vouchers comprises the identifier of the set, a period of validity, a bunch of secret keys, the number of vouchers of the booklet designated by n, the running marker of the booklet, the maximum value of the marker (for example, 250 with an octet), if appropriate the minimum value of the marker (here 0 for an octet), and finally a list of n indices (each written, for example, on an octet). Each of these indices is secret as long as it is not consumed. By revealing it, the card consumes the corresponding voucher.

The marker of the booklet in the consumption card is fixed by the value of the running marker in the management card at the moment when the first number has been selected to form the booklet.

For the consumption of the vouchers, the consumption card first gives the maximum value of the marker, the minimum value of the marker and then the running marker which flags the first unconsumed voucher. Subsequently, the consumption card reveals the indices of the vouchers on request.

FIG. 6 shows a voucher corresponding to the situation where the marker P and the index I are octets. In the example illustrated, the voucher corresponds to the sixth word and to the 34 th bit of this word, this corresponding to the number $5 \times 256 + 34 = 1314$.

At the level of the central system, for each set issued, the management information is summarised in a checking array which is a sequence of 3 t bits, with t bits for the consumptions and t doublets, each of 2 bits, for the state of the sales. Such a checking array is shown in FIG. 6 (part a).

As illustrated in FIG. 6, part b:

if the j'th consumption bit is 1, then the j'th voucher has not yet been presented by an operator, if the j'th consumption bit is 0, then the j'th voucher has already been presented by an operator.

As illustrated in FIG. 6, part c:

if the j'th sales doublet is 00, then the j'th voucher will not be sold (initial decision by the issuer)

if the j'th sales doublet is 01, then the j'th voucher will not be sold (closure of the sale), if the j'th sales doublet is 10, then the j'th voucher has been sold, if the j'th sales doublet is 11, then the j'th voucher is on sale.

Whenever a management card is consulted or recovered or a consumption array is presented for endorsement, the issuer of access titles updates the checking array corresponding to the set.

An anomaly report is prepared from the moment of the first consumption when the voucher will not be sold and at the second consumption in the other cases. Of course, it can happen that the information describing the consumption of a voucher is applied to the checking array before the information describing the sale of the voucher.

The anomaly report comprises the identifier of the set, the number of the voucher and also the name of the operator who has endorsed the suspect voucher. The issuer of access titles can, if appropriate, locate the management card which has sold the suspect voucher. The specification of the anomaly reports can be refined after the system has been put into operation. The anomaly reports must be accessible according to set identifier and voucher number, but also according to operator identifier and even seller identifier.

The issuer of access titles can also provide the operators with some of the information on the unsold vouchers, to allow them to participate in the check. For this purpose, the issuer of access titles draws up a partial checklist of approximately half the numbers initially removed. This checklist can advantageously be inserted in the operating card.

If the transmission of the consumed numbers between the consumption card and the operating card is scrambled, then it is even possible for the checklist not to be consultable by the service operator.

With regard to a file of access titles embodying a booklet of vouchers according to the method of the invention, an additional notion which is that of the state of the file (free or occupied) is useful.

The consumption operation begins with a mutual authentication and an exchange of information (identifiers, set identifier, date and time, balance in vouchers) between the consumption card and an operating card. This authentication employs, in the bunch, a secret key reserved for the operator in question. The dedicated file embodying the booklet is then put into the "occupied state" in the consumption card which can subsequently be disconnected from the system.

At the end of the operation, another mutual authentication occurs between the consumption card and an operating card (this is not necessarily the same operating card). This authentication employs, in the bunch, a secret key belonging to the same operator. The operating card fixes the number of vouchers required. After the consumption (revelation of numbers), the access-title file is "freed"; the consumed vouchers can subsequently be destroyed in the consumption card.

If the set is in opposition, the booklet is not reclosed, that is to say the file remains in the "occupied state". The consumer is invited to go to a sales counter in order to regularise the situation.

We claim:

1. A method of performing an electronic automated transaction by initializing a management card from an initial management card, said management card for interfacing with a consumption card, to copy a plurality of tokens to said consumption card in order for said consumption card to transfer tokens to a vendor by interfacing said consumption card with a vendor card to copy a predetermined number of tokens to said vendor card, each of said cards including a microprocessor and input and output terminals, comprising the steps of:

generating a distribution array in said initial management card, said distribution array including an initial set of t consecutive entries in said initial management card, a random portion of said numbers being removed from said set;

generating a subset of numbers from said initial set and copying each number of said subset to said management card to form a sales array; said sales array including t number of entries, each entry corresponding to one of said tokens; each token being valid for payment upon interfacing said consumption card with said vendor card;

copying a predetermined amount of tokens from said sales array of said management card to said consumption card; upon transacting a sale, copying a predetermined number of tokens from said consumption card to said vendor card; updating said consumption card to prevent said copied tokens from again being copied to said vendor card or a further vendor card; and comparing the corresponding number of each token received by said vendor card with the corresponding number on said management card to authenticate a valid transfer of tokens between said consumption card and said vendor card.

2. The method of claim 1, wherein the step of generating said distribution array includes resetting all t entries to a sale state and then setting p entries to a no sale state.

3. The method of claim 2, wherein an entry in said distribution and sales arrays are equal to one if in a sale state and equal to zero when in a no sale state.

4. The method of claim 3, wherein the step of generating said sales array includes resetting all t entries to one and setting the (t−p) entries to zero.

5. The method of claim 4, wherein the step of transferring tokens from said management card to said consumption card includes selecting the entries in said sales array which are in a sale state, copying the entries to said consumption card and setting the copied entries in said sales array to a no sale state.

6. The method of claim 5, wherein each entry in said sales array and said distribution array are positioned in an array of Q words, each word having R bits, whereby each entry corresponds to one of the R bits in the Q words.

7. The method of claim 6, wherein the step of copying the selected tokens from said initial management card to said management card and from said management card to said consumption card includes locating said selected token by assigning each token a marker which identifies the word where the selected token is located and an index which identifies which of the R bits of the marked word contains the selected token.

8. The method of claim 7, wherein the marker and index each include eight bits and wherein each token is identified by sixteen bits, the most significant eights bits representing the marker and least significant eight bits representing the index.

9. The method of claim 8, wherein the step of coping tokens from said sales array to said consumption card includes incrementing the marker by one and selecting a random index, copying the corresponding index to said consumption card if the token is in a sale state, and if the token is in a no sale state, incrementing the index by one until a token in a sale state is located.

10. The method of claim 1, wherein said management card includes a checking array, each entry in said checking array corresponding to a token, each entry having three bits, a first bit for exhibiting whether said token has been presented by said operating card, said second and third bits for exhibiting whether said token has been copied from said management card to said consumption card or will never be transferred from said management card to said consumption card.

11. The method of claim 1, wherein the copying of tokens from said initial management card to said management card, from said management card to said consumption card and from said consumption card to said vendor card is encrypted.

12. The method of claim 10, further including the step of transferring portions of the checking array to said operating card.

13. The method of claim 1, wherein each token is in one of a populated state and an exhausted state, whereby each token in a populated state can be transferred to said vendor card and whereby each token in an exhausted state can not be transferred to said vendor card.

14. An automated electronic transaction system comprising:

an initial management card including a microprocessor mounted therein and data input and output means connected to said microprocessor;

at least one management card including a microprocessor mounted therein and data input and output means connected to said microprocessor;

a consumption card including a microprocessor mounted therein and data input and output means connected to said microprocessor;

an vendor card including a microprocessor mounted therein and data input and output means connected to said microprocessor;

means for interfacing said initial management card and said management card for copying a predetermined number of tokens from said initial management card to said management card;

first updating means for updating the status of said initial management card to prevent said copied tokens to be transferred to any other management card;

means for interfacing said management card and said consumption card for copying a predetermined number of tokens from said management card to said consumption card;

second updating means for updating the status of said management card to prevent said copied tokens to be copied to any other vendor card;

means for interfacing said consumption card and said operating card to copy tokens from said consumption card to said operating card upon a successful sale; and third updating means for updating the status of said consumption card to prevent said copied tokens to be copied from said consumption card.

15. The method of claim 13, wherein said operating card includes information which indicates whether a token is in one of a populated state and an exhausted state.

* * * * *